(12) United States Patent
Mahaffey et al.

(10) Patent No.: US 10,798,797 B1
(45) Date of Patent: Oct. 6, 2020

(54) CEILING MOUNT SENSOR ASSEMBLY

(71) Applicant: Douglas Lighting Controls, Inc., Burnaby (CA)

(72) Inventors: Rob Mahaffey, Burnaby (CA); John Cavacuiti, Burnaby (CA); Wilson Tse, Burnaby (CA); Glen Tracey, Burnaby (CA); Jon Schmidt, Burnaby (CA)

(73) Assignee: Douglas Lighting Controls, Burnaby, British Columbia (CA)

( * ) Notice: Subject to any disclaimer, the term of this patent is extended or adjusted under 35 U.S.C. 154(b) by 539 days.

(21) Appl. No.: 15/470,167

(22) Filed: Mar. 27, 2017

Related U.S. Application Data

(60) Provisional application No. 62/314,170, filed on Mar. 28, 2016.

(51) Int. Cl.
```
H05B 47/175      (2020.01)
H05B 47/19       (2020.01)
G01J 5/04        (2006.01)
F21S 8/02        (2006.01)
H05B 47/11       (2020.01)
G01J 1/02        (2006.01)
H05B 47/105      (2020.01)
```

(52) U.S. Cl.
CPC .............. *H05B 47/11* (2020.01); *F21S 8/026* (2013.01); *G01J 1/0271* (2013.01); *G01J 5/041* (2013.01); *H05B 47/105* (2020.01); *H05B 47/19* (2020.01)

(58) Field of Classification Search
CPC ........ F21V 23/0442; E04B 9/006; E04B 9/00; F16M 13/027
USPC ....... 248/343; 362/276; 340/540, 500–686.6; 29/729, 798
See application file for complete search history.

(56) References Cited

U.S. PATENT DOCUMENTS

| | | | | | |
|---|---|---|---|---|---|
| 2,100,042 | A | * | 11/1937 | Travis | H01R 33/7664 313/49 |
| 2,140,443 | A | * | 12/1938 | Clark | H05K 7/12 248/27.3 |
| 3,162,067 | A | * | 12/1964 | Koons | B23B 51/0473 408/206 |
| 3,420,995 | A | * | 1/1969 | Dunckel | F21V 21/04 362/366 |
| 3,620,401 | A | * | 11/1971 | Lund | F21V 21/04 220/3.6 |
| 3,749,873 | A | * | 7/1973 | Harper | H01H 71/0264 200/293 |
| 3,768,567 | A | * | 10/1973 | Weise | A62C 35/605 169/26 |

(Continued)

*Primary Examiner* — Peter Dungba Vo
*Assistant Examiner* — Kaying Kue
(74) *Attorney, Agent, or Firm* — Patterson Intellectual Property Law, P.C.; Gary L. Montle; Alex H. Huffstutter

(57) ABSTRACT

A sensor assembly may be mounted in a ceiling used with an associated light fixture. The sensor assembly may include a body including a sensor end and a blade end opposite the sensor end. A sensor may be disposed on the body nearer the sensor end than the blade end. A cutting blade may be disposed on the body nearer the blade end than the sensor end. The cutting blade may be configured to cut an opening in the ceiling. At least one retainer protrusion may be disposed on the body between the sensor and the cutting blade. The at least one retainer protrusion may be configured to retain the sensor assembly in the opening of the ceiling.

21 Claims, 7 Drawing Sheets

(56) References Cited

U.S. PATENT DOCUMENTS

| | | | | |
|---|---|---|---|---|
| 3,776,313 A * | 12/1973 | DePalma | ............... | A62C 35/10 |
| | | | | 169/19 |
| 4,096,964 A * | 6/1978 | Glick | ............... | H02G 3/12 |
| | | | | 220/3.4 |
| 4,268,825 A * | 5/1981 | Kaplan | ............... | A01C 7/105 |
| | | | | 340/684 |
| 4,444,369 A * | 4/1984 | Job | ............... | G12B 9/00 |
| | | | | 248/27.1 |
| 4,847,501 A * | 7/1989 | Warner | ............... | F16B 2/246 |
| | | | | 250/342 |
| 4,963,962 A * | 10/1990 | Kruegle | ............... | G02B 27/642 |
| | | | | 348/151 |
| 5,039,853 A * | 8/1991 | Blake | ............... | H01L 31/0203 |
| | | | | 200/294 |
| 5,082,403 A * | 1/1992 | Sutton | ............... | B23B 51/0453 |
| | | | | 408/204 |
| 5,167,475 A * | 12/1992 | Miyanaga | ............... | B23B 31/113 |
| | | | | 408/201 |
| 5,452,193 A * | 9/1995 | Hinnefeld | ............... | F21S 8/02 |
| | | | | 362/148 |
| 5,458,201 A * | 10/1995 | Brim | ............... | A62C 13/76 |
| | | | | 169/26 |
| 5,567,041 A * | 10/1996 | Slocum | ............... | F21S 8/02 |
| | | | | 362/148 |
| 5,653,561 A * | 8/1997 | May | ............... | B23Q 11/0046 |
| | | | | 408/67 |
| 6,113,245 A * | 9/2000 | Reinert, Sr. | ............... | B64F 1/20 |
| | | | | 362/153 |
| 6,120,220 A * | 9/2000 | Speare | ............... | B23B 51/05 |
| | | | | 408/1 R |
| 6,364,511 B1 * | 4/2002 | Cohen | ............... | F21S 8/02 |
| | | | | 362/148 |
| 6,554,458 B1 * | 4/2003 | Benghozi | ............... | F21V 21/04 |
| | | | | 362/147 |
| 6,769,562 B2 * | 8/2004 | Schroeder | ............... | H02G 3/123 |
| | | | | 174/50 |
| 6,814,527 B1 * | 11/2004 | Fleming | ............... | B23B 51/0426 |
| | | | | 175/211 |
| 6,827,471 B1 * | 12/2004 | Benghozi | ............... | F21V 21/04 |
| | | | | 362/147 |
| 7,264,380 B1 * | 9/2007 | Monroe | ............... | F21V 11/16 |
| | | | | 362/352 |
| 7,322,722 B2 * | 1/2008 | Hartmann, Jr. | ............... | F21S 8/02 |
| | | | | 362/365 |
| 7,490,960 B1 * | 2/2009 | Fiorino | ............... | F21V 23/0442 |
| | | | | 362/276 |
| 7,667,136 B2 * | 2/2010 | Dinh | ............... | H02G 3/123 |
| | | | | 174/58 |
| 7,673,842 B2 * | 3/2010 | Nevers | ............... | F16F 1/025 |
| | | | | 248/343 |
| 8,393,779 B2 * | 3/2013 | Myojo | ............... | F21V 23/006 |
| | | | | 362/647 |
| 9,163,814 B2 * | 10/2015 | Plunk | ............... | F21S 8/02 |
| 9,597,736 B2 * | 3/2017 | Steele | ............... | B23B 51/05 |
| 9,677,747 B2 * | 6/2017 | Highbridge | ............... | F21S 8/026 |
| 9,782,839 B2 * | 10/2017 | Novak | ............... | B23B 51/0406 |
| 10,156,071 B2 * | 12/2018 | Little | ............... | F21V 21/045 |
| 10,323,426 B1 * | 6/2019 | Sandvig | ............... | E04G 21/123 |
| 10,337,705 B2 * | 7/2019 | Rolf | ............... | H02J 7/00302 |
| 2002/0131271 A1 * | 9/2002 | Schubert | ............... | F21V 21/04 |
| | | | | 362/365 |
| 2003/0223240 A1 * | 12/2003 | Houle | ............... | F21V 21/04 |
| | | | | 362/364 |
| 2004/0120141 A1 * | 6/2004 | Beadle | ............... | F21V 5/04 |
| | | | | 362/147 |
| 2005/0258326 A1 * | 11/2005 | St-Pierre | ............... | H02G 3/123 |
| | | | | 248/316.7 |
| 2006/0026954 A1 * | 2/2006 | Truong | ............... | F03D 3/02 |
| | | | | 60/398 |
| 2007/0263393 A1 * | 11/2007 | Van De Ven | ............... | F21V 7/005 |
| | | | | 362/362 |
| 2008/0087446 A1 * | 4/2008 | Sitabkhan | ............... | A62C 37/12 |
| | | | | 169/57 |
| 2008/0196906 A1 * | 8/2008 | Nusbaum | ............... | A62C 37/36 |
| | | | | 169/43 |
| 2008/0272922 A1 * | 11/2008 | Spellman | ............... | G08B 17/10 |
| | | | | 340/628 |
| 2009/0071664 A1 * | 3/2009 | Sitabkhan | ............... | A62C 37/12 |
| | | | | 169/57 |
| 2009/0141499 A1 * | 6/2009 | Fabbri | ............... | F21S 8/043 |
| | | | | 362/276 |
| 2011/0317861 A1 * | 12/2011 | Haase | ............... | F21S 8/026 |
| | | | | 381/333 |
| 2012/0286131 A1 * | 11/2012 | Arnold, III | ............... | F24F 13/32 |
| | | | | 248/674 |
| 2013/0201668 A1 * | 8/2013 | Chien | ............... | F21K 9/23 |
| | | | | 362/183 |
| 2013/0207552 A1 * | 8/2013 | Plunk | ............... | F21S 8/04 |
| | | | | 315/152 |
| 2013/0306365 A1 * | 11/2013 | Meah | ............... | H02G 3/20 |
| | | | | 174/40 R |
| 2013/0319752 A1 * | 12/2013 | Cowles | ............... | F21V 21/04 |
| | | | | 174/491 |
| 2014/0117877 A1 * | 5/2014 | Mapel | ............... | F21S 19/005 |
| | | | | 315/294 |
| 2014/0223716 A1 * | 8/2014 | Gwon | ............... | F21S 41/275 |
| | | | | 29/426.1 |
| 2014/0373367 A1 * | 12/2014 | Pinal | ............... | B43L 13/20 |
| | | | | 33/1 N |
| 2015/0241027 A1 * | 8/2015 | Zhang | ............... | F21V 7/0033 |
| | | | | 362/300 |
| 2016/0051849 A1 * | 2/2016 | Williams | ............... | A62C 35/68 |
| | | | | 29/525.08 |
| 2017/0067659 A1 * | 3/2017 | Silver | ............... | F24F 7/08 |
| 2018/0128448 A1 * | 5/2018 | Chien | ............... | F21K 9/60 |

\* cited by examiner

US 10,798,797 B1

CEILING MOUNT SENSOR ASSEMBLY

CROSS-REFERENCES TO RELATED APPLICATIONS

This application claims benefit of the following patent application(s) which is/are hereby incorporated by reference: U.S. Provisional Patent Application No. 62/314,170 filed Mar. 28, 2016.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Stricter energy code requirements require that luminaires require control capability such as utility driven Demand Response, daylight harvesting, occupancy sensing, bi-level dimming and/or on/off control.

In certain applications it is difficult to run control wires either due to cost (adding conduit and installation labor) or the site may contain hazardous materials (such as an older building) where installation may disrupt these materials and/or invoke additional installation costs to deal with them.

For the majority of office spaces in North America the most common type of ceiling is the acoustic tile drop down T-bar ceiling. Sensors may be installed in this type of ceiling. Typically, occupancy sensors are large and require the ceiling tile to be cut and or drilled for the installation of the product.

BRIEF SUMMARY OF THE INVENTION

The present invention is a miniaturized wireless occupancy sensor/controller that can be installed in a drop tile ceiling without the use of tools and presents a very small, non-intrusive device when the install is completed.

In one aspect, the invention provides a sensor that makes installation in the ceiling tile easy and that can be performed without tools.

The sensor of the present invention is miniaturized to avoid making a large hole in the ceiling tile. For example, the sensor may be incorporated in essentially a ~1" in diameter cylinder.

One end of the sensor may include a "cookie cutter" style knife edge that may be designed to easily and neatly cut through ceiling tile, thus not requiring the installer to use a hole saw attached to a drill.

Installation costs run on average of $75 to $100 per hour for the installation of lighting controls. Reducing the time for install can save up to 20% of the labor of installation on a large project with 100+ sensors.

DETAILED DESCRIPTION OF THE INVENTION

Figure 1:
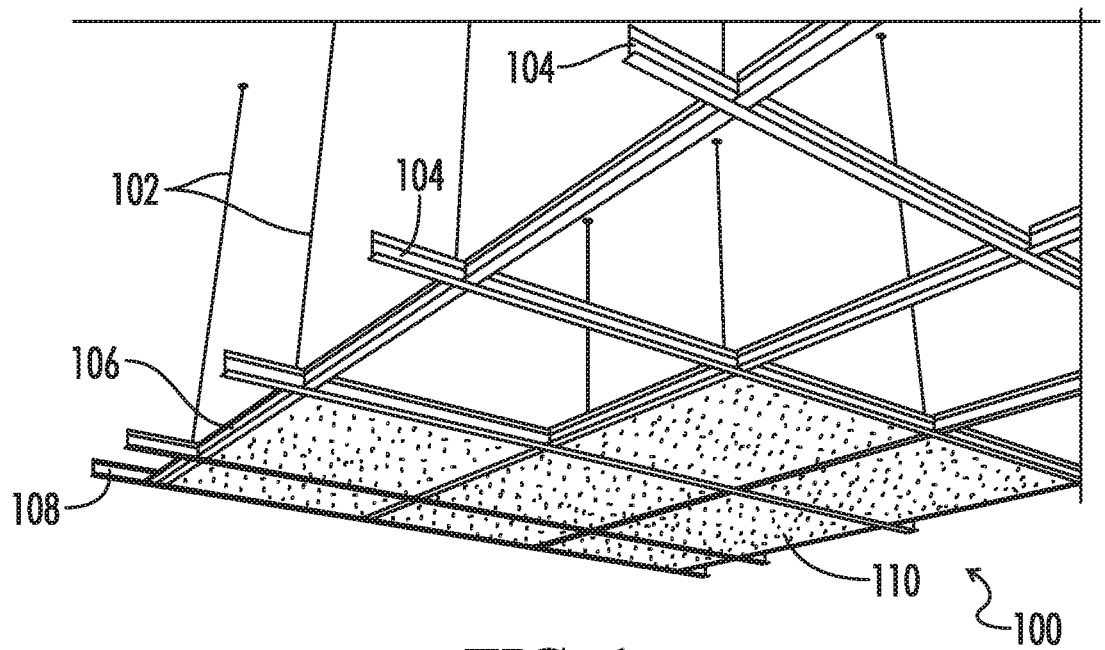
FIG. 1 is a diagrammatic view of a typical drop tile ceiling used in many office buildings and other structures.

Turning now to FIG. 1, a drop tile ceiling assembly 100 is shown. The drop tile ceiling assembly 100 includes a plurality of hanger wires 102. The plurality of hanger wires are connected to one of a plurality of main beams 104. The plurality of main beams 104 include cross beams 106 placed between respective main beams. The edge of the assembly 100 includes edge molding 108. Ceiling tiles 110 are placed in the openings formed by the main beams 104 and the cross beams 106. The ceiling tiles 110 are typically made from a sound dampening material that has been pressed into the appropriate shape. These ceiling tiles 110 are easily cut with even dull-edged tools.

Figure 2:
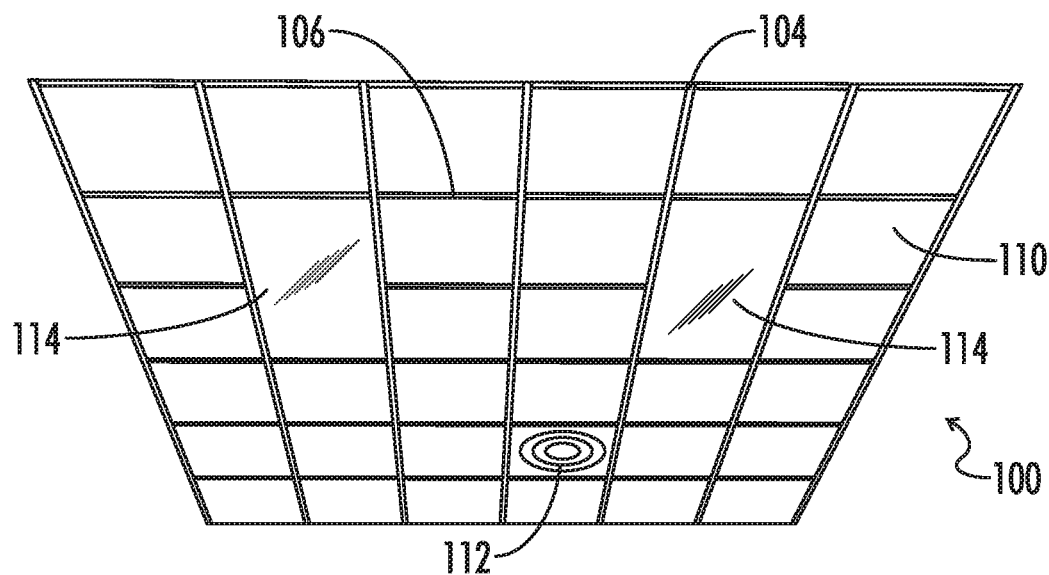
FIG. 2 is a photograph of a typical drop tile ceiling such as that of FIG. 1.

FIG. 2 shows the drop tile ceiling assembly 100 including a ventilation plate 112 and lighting fixtures (or luminaires) 114. Energy code requirements have become stricter as society progresses toward a more energy efficient model. Current energy codes require measures including automatic daylight control and shutoff control of lighting fixtures 114 in new construction and many alterations of existing spaces.

Figure 3:
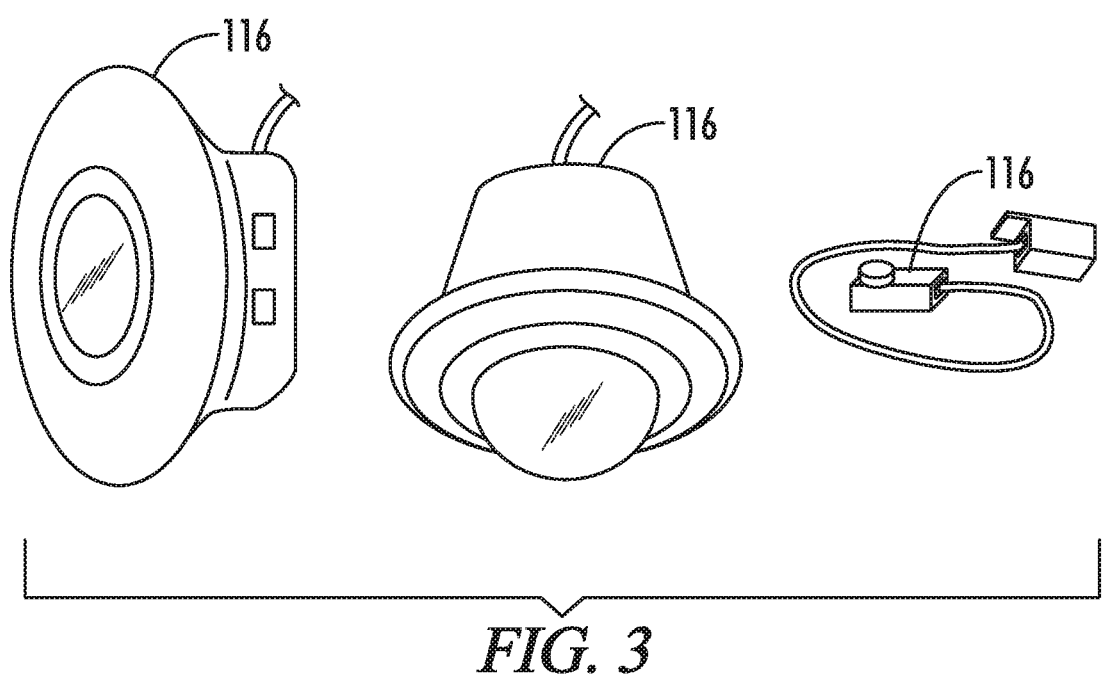
FIG. 3 illustrates a few examples of available conventional occupancy sensors.

Turning now to FIG. 3, typical occupancy sensors 116 are shown. These known occupancy sensors 116 are large and require the ceiling tile 110 to be cut and or drilled with one or more tools for the installation of the sensor. The tools required for installation may include one or more saws, drills, and the like.

Figure 4:
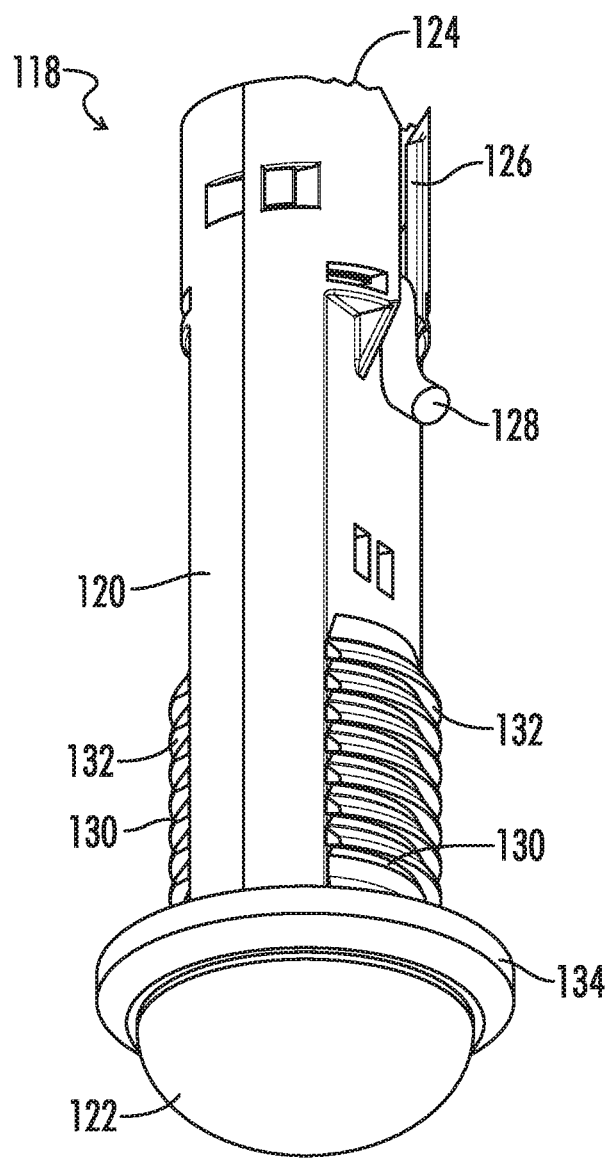
FIG. 4 is a perspective view of an embodiment of the ceiling mount wireless sensor and controller according to aspects of the present invention.

FIG. 4 shows an embodiment of the sensor/controller device 118 of the present invention. The sensor/controller device 118 may include a body 120. The body 120 may be made of any appropriate material including, but not limited to, metals, polymers, composites, and the like. A lens 122 may be included integrally or connected to the body 120 on a sensor end of the body. The lens 122 may cover an occupancy sensor (not shown). Non-limiting examples of an occupancy sensor include PIR sensors and ultrasonic presence and motion sensors.

A serrated edge 124 may be included integrally or connected to the body 120 on a blade end of the body. The blade end of the body 120 may be opposite the sensor end of the body. Nearer the blade end of the body 120 than the sensor end of the body, a groove (or slot, indentation, and the like) 126 may be included in the body to provide room for a connecting wire 128.

The connecting wire 128 may be connected to a respective lighting fixture 114. The connecting wire 128 may be placed in the groove 126 so as to keep the connecting wire out of the way during the installation process of the sensor/controller device 118 into a given ceiling tile 110.

The sensor/controller device 118 may further include one or more retainers 130. In FIG. 4, the retainers 130 may include at least one flexible protrusion 132 made from any appropriate material. One non-limiting example of a flexible protrusion material may include rubber or other polymers. The retainers 130 may be connected to the body 120 or integrally formed therewith. The retainers 130 may aid in maintaining the sensor/controller device 118 in place after it has been installed in a given ceiling tile 110. Such a configuration may allow some embodiments of the sensor/controller device 118 to be installed without further mounting brackets and the like.

Figure 5:
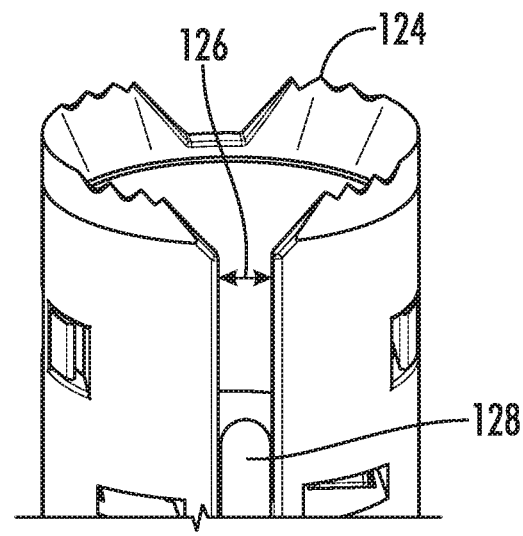
FIG. 5 is a detailed perspective view of the cutting edge of the sensor and controller of FIG. 4.

As can be best seen in FIG. 5, the serrated edge 124 of the body 120 may be used to cut an appropriate hole in a given ceiling tile 110. Once the hole has been cut with the sensor/controller device, a circular plug of the ceiling tile 110 material may be present in the opening defined by the serrated edge 124. In such a situation, the connecting wire 128 may be removed from the groove 126 and lifted such that the circular plug may easily travel out of the opening defined by the serrated edge 124.

Figure 6:
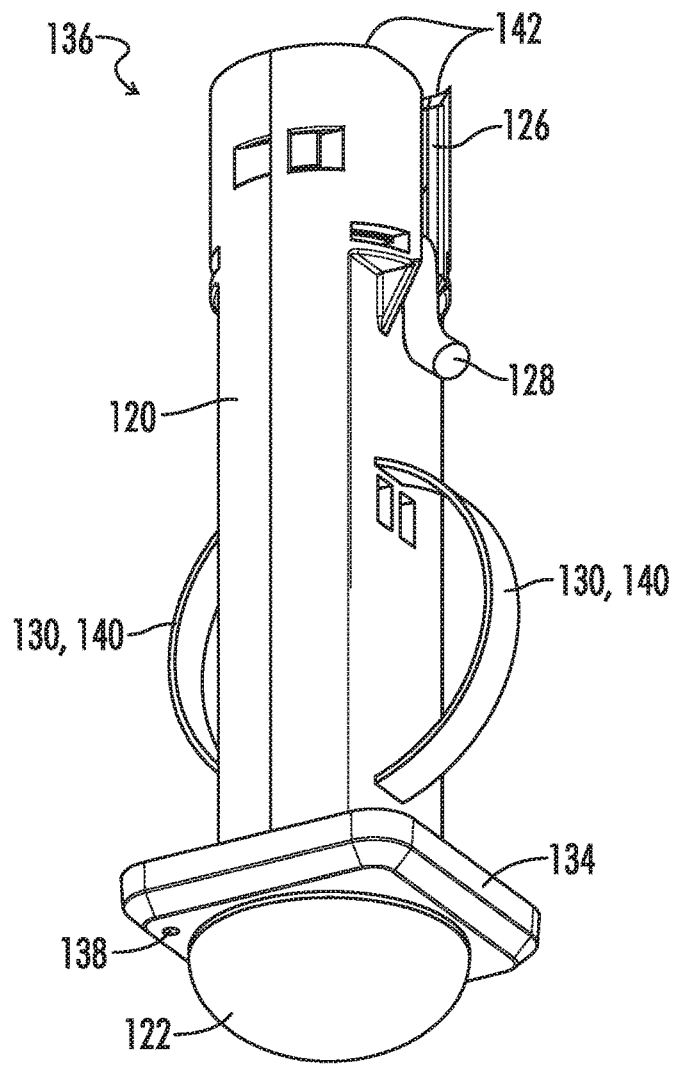
FIG. 6 is a perspective view of an alternative embodiment of the ceiling mount wireless sensor and controller.

A flange portion 134 may be formed integrally with or connected to the body 120 nearer the sensor end than the blade end of the body. The flange portion 134 may be circular (as shown in FIG. 4), square (as shown in FIG. 6), or any other appropriate shape including, but not limited to, rectangular, triangular, hexagonal, and the like. The flange portion 134 may be configured to rest against a given ceiling tile 110 so as to provide an aesthetically pleasing appearance when the sensor/controller device 118 is installed. In some embodiments, the flange portion 134 may be further configured to aid in retaining the ceiling tile 110 in place.

Figure 7:
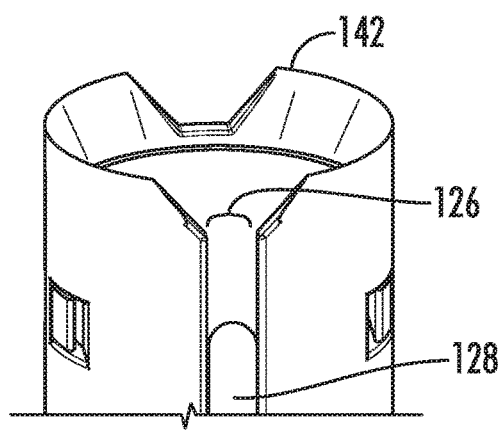
FIG. 7 is a detailed perspective view of the cutting edge of the sensor and controller of FIG. 6.

Turning now to FIGS. 6 and 7, an alternative embodiment of a sensor/controller device 136 of the current invention is shown. A light pipe opening 138 including a photocell (not shown) may be located on the body 120 nearer the sensor end of the body than the flange portion 134. In some non-limiting examples, the light pipe opening 138 may be located on the flange portion 134. The sensor/controller device 136 may also include retainers 130 including at least one resilient member 140. The resilient member 140 may include, in a non-limiting example, a leaf spring. Similar to the flexible protrusions 132 in FIG. 4, the resilient members 140 may aid in retaining the sensor/controller device 136 (in conjunction with the flange portion 134) on a given ceiling tile 110. As is shown in FIG. 7, the blade end of the body 120 may include a straight edge 142 instead of the serrated edge 124 of FIG. 5.

Figure 8:
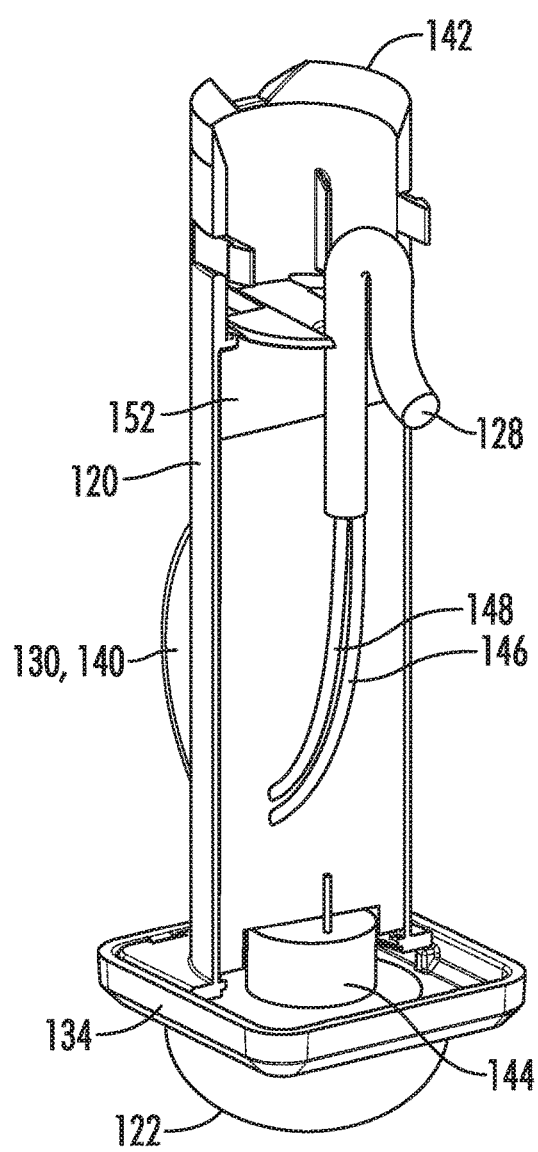
FIG. 8 is a partial cross-sectional perspective view of the sensor and controller of FIG. 6.
Figure 9:
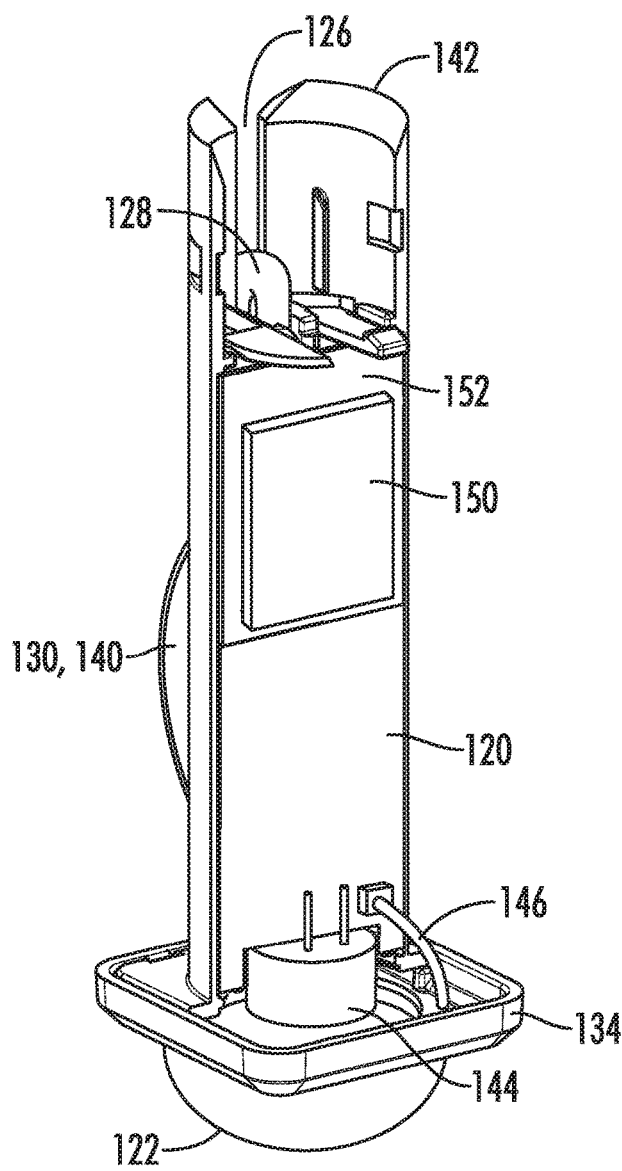
FIG. 9 is a partial cross-sectional perspective view of the sensor and controller of FIG. 6 on the opposite side of the sensor and controller from that of FIG. 8.

As shown in FIG. 8, the sensor/controller device 136 may include therein a sensor 144, a light pipe 146, and a cable 148. The sensor 144, in some non-limiting embodiments, may be an occupancy sensor such as an ultrasonic motion sensor, photocell or PIR sensor. The light pipe 146 may carry light to the photocell (not shown). Alternatively, the light pipe 146 may instead be another cable or wire carrying a signal from a photocell located nearer the sensor end of the body 120 than the blade end. The cable 148 may include one or more conductors that carry power and/or control signals to and from the sensor 144. The cable 148 may alternatively or additionally carry a signal from the sensor 144 to a processor 150 (shown in FIG. 9). The processor 150 may include, in non-limiting examples, a wireless communication unit, powerline carrier transceiver, a controller, a signal receiver, and the like. A wireless communication unit of the processor 150 may utilize any appropriate form of wireless communication including, but not limited to, radio frequencies, light signals, and the like. In some embodiments, the sensor/controller device 136 may include a circuit board 152 for connecting the processor 150 to various other components. Some embodiments may include the circuit board 152 and/or the processor 150 functionally connected to the sensor 144, the photocell (not shown), and the respective lighting fixture 114.

Figure 10:
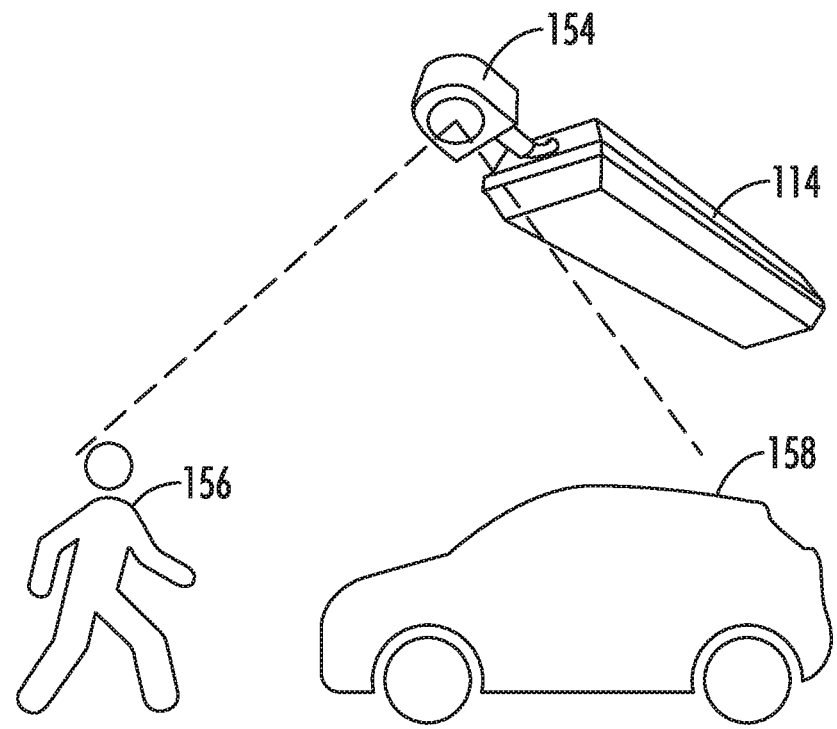
FIG. 10 is a schematic illustration of use of an embodiment of a ceiling mount wireless sensor and controller for fixture control according to occupancy of a region by a person or a vehicle.

As shown in FIG. 10, some embodiments of the present invention may include connecting a sensor/controller device 154 directly to a respective lighting fixture 114. In one embodiment, the connection may be through the knock-out opening in the lighting fixture 114. The sensor/controller device 154 may be configured to illuminate the lighting fixture 114 for a predetermined amount of time after sensing movement (or other sign of occupancy) from an individual 156 or a vehicle 158 (in environments such as parking garages). The sensor/controller device 154 may control the lighting fixture 114 such that, after a certain amount of time has passed since detection of occupancy, the lighting fixture is turned off or is dimmed. Also, the lighting fixture 114 may be dimmed or turned off when the sensor/controller device 154 detects a certain amount of ambient light due to daylight (sensed via the photocell in the light pipe 146).

Figure 11:
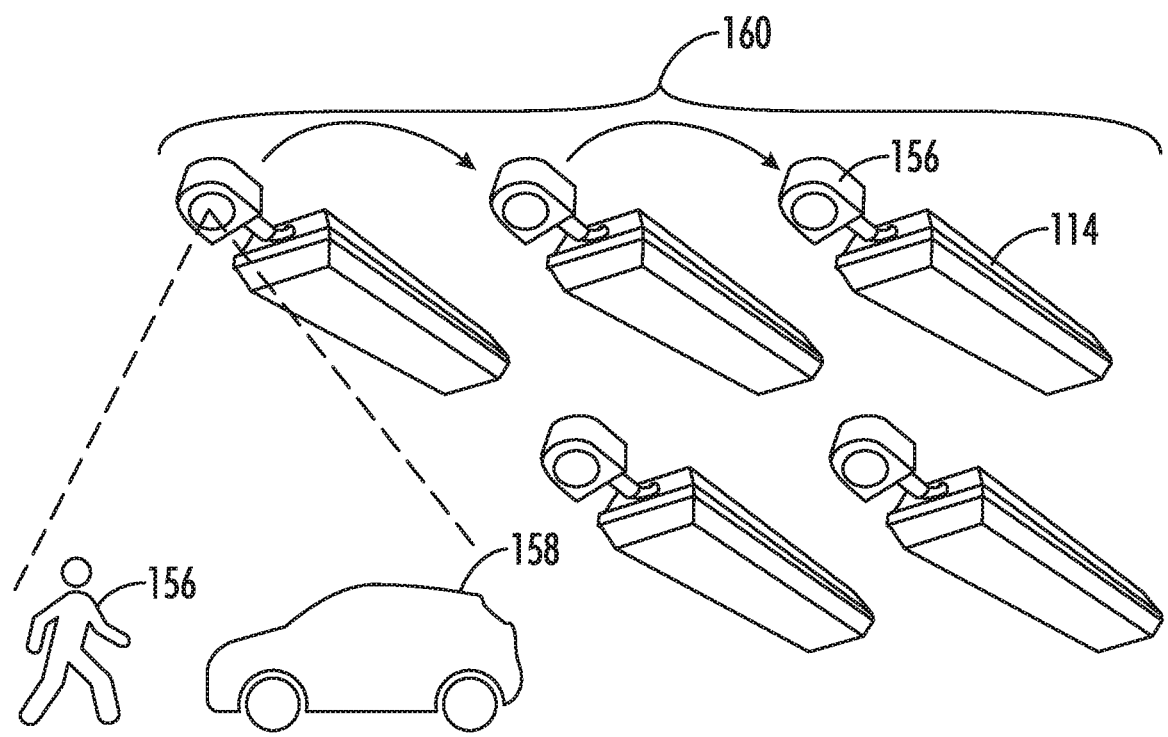
FIGS. 11 and 12 are schematic illustrations of use of embodiments of a ceiling mount wireless sensor and controller for multiple fixture control according to occupancy by a person or a vehicle in one or more zones.

Turning now to FIG. 11, an array 160 of sensor/controller devices 154 and respective lighting fixtures 114 may be located in an environment, such as a garage. The array 160 may include capabilities including, but not limited to, any one of the sensor/controller devices 154 sending an activation signal to all or one of the other sensor/controller devices. The sensor/controller devices 154 may activate as a daisy chain or, alternatively, may activate simultaneously from the initially activating sensor/controller device. In one embodiment, the initially activating sensor/controller device 154, upon detecting occupancy by an individual 156 or vehicle 158, may send a signal to a host system (not shown). The host system may then send a signal activating respective other sensor/controller devices 154. In some embodiments, all the sensor/controller devices 154 may be a master controller to activate the reaction of all the designated sensor/controller devices. In other embodiments, at least some of the sensor/controller devices 154 may be passive slave devices that are unable to command other sensor/controller devices to activate. In some embodiments, up to 50 lighting fixtures 114 may be activated at once as part of a single zone.

Figure 12:
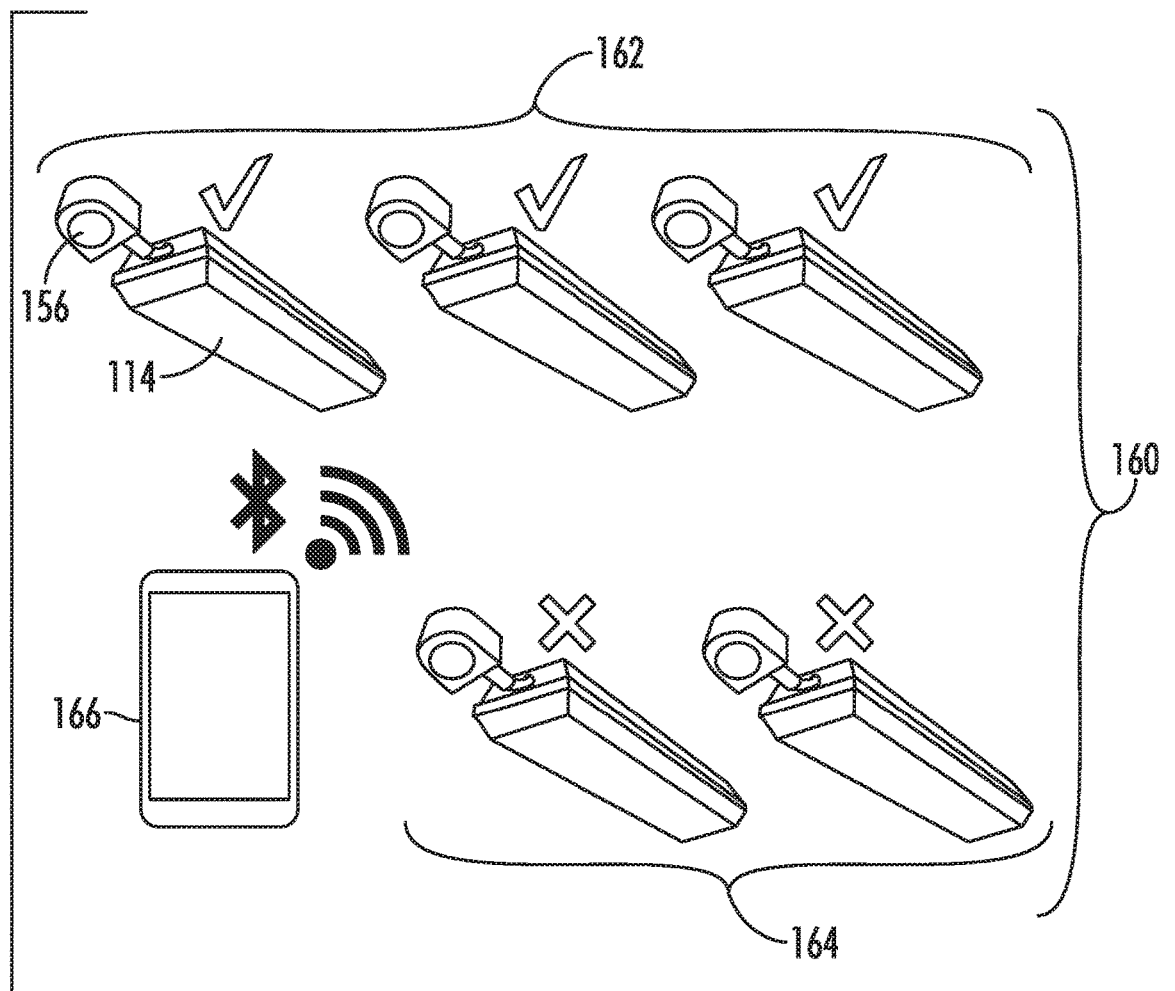

As shown in FIG. 12, the array 160 of sensor/controller devices 154 and their respective lighting fixtures 114 may include at least a first zone 162 and a second zone 164. One non-limiting embodiment includes up to 9 zones. More than 9 zones are contemplated, however. In some embodiments, a user may designate which sensor/controller devices 154 and their respective lighting fixtures 114 belong to the first zone 162 and which belong to the second zone 164. Alternatively, a user may designate a first zone 162 and no other zone, leaving the non-zoned sensor/controller devices 154 and their respective lighting fixtures 114 to be stand-alone units that will not turn on or off as a result of another device detecting occupancy, lack of occupancy, or adequate ambient light conditions. A user may use a host system (not shown) or, in some embodiments, a user's mobile device (such as a cell phone, tablet, or laptop) 166 to designate each desired sensor/controller device 154 and its respective lighting fixture 114 to a zone (or not). A user may create each zone at the time of installation of the sensor/controller devices 154 using an appropriate program. The program may include, in a non-limiting embodiment, an application. The factory default setting for the sensor/controller devices 154 may be one zone that activates and deactivates all lighting fixtures 114 associated with their respective sensor/controller devices at once. The mobile device 166 may designate the appropriate zones by any means known in the art including, but not limited to, wired and wireless communication.

Thus, although there have been described particular embodiments of the present invention of a new and useful CEILING MOUNT SENSOR ASSEMBLY it is not intended that such references be construed as limitations upon the scope of this invention except as set forth in the following claims.

What is claimed is:

1. A sensor assembly to be mounted in a ceiling and electrically connected to an associated light fixture, the sensor assembly comprising:
    a body including a sensor end and a blade end opposite the sensor end;
    a sensor disposed on the body nearer the sensor end than the blade end;
    a cutting blade extending from the blade end of the body in a direction opposite the sensor end, the cutting blade configured to cut an opening in the ceiling; and
    at least one retainer protrusion disposed on the body between the sensor and the cutting blade, the at least one retainer protrusion configured to retain the sensor assembly in the opening of the ceiling,
    wherein the at least one retainer protrusion includes a resilient retainer protrusion,
    wherein the resilient retainer protrusion includes a leaf spring.

2. The sensor assembly of claim 1, wherein the resilient retainer protrusion includes a flexible polymer.

3. The sensor assembly of claim 1, further comprising a flange disposed on the body between the sensor and the at least one retainer protrusion, the flange and the at least one retainer protrusion configured to retain the sensor assembly in the opening of the ceiling with at least a portion of the ceiling disposed between the flange and the at least one retainer protrusion.

4. The sensor assembly of claim 1, wherein the cutting blade includes a serrated edge.

5. The sensor assembly of claim 1, further comprising a groove defined in the body nearer the blade end than the sensor end.

6. The sensor assembly of claim 5, further comprising:
    a connecting wire configured to functionally connect the sensor assembly with the associated light fixture; and
    wherein the connecting wire is configured to be positioned in the groove.

7. The sensor assembly of claim 1, wherein:
    the body includes a generally cylindrical shape; and
    the cutting blade is configured to cut a generally circular plug out of the ceiling.

8. The sensor assembly of claim 1, wherein the sensor includes an occupancy sensor.

9. The sensor assembly of claim 8, further comprising a light sensor disposed nearer the sensor end than the blade end of the body.

10. The sensor assembly of claim 9, wherein the light sensor includes a photocell disposed in a light pipe.

11. The sensor assembly of claim 1, further comprising a controller functionally connected to the sensor and configured to control the associated light fixture.

12. The sensor assembly of claim 1, wherein the cutting blade and the body form a single unitary part.

13. A sensor assembly to be mounted in a ceiling and electrically connected to an associated light fixture, the sensor assembly comprising:
    a body including a sensor end and a blade end opposite the sensor end;
    a sensor disposed on the body nearer the sensor end than the blade end;
    a cutting blade disposed on the body nearer the blade end than the sensor end, the cutting blade configured to cut an opening in the ceiling; and
    at least one resilient retainer protrusion disposed on the body between the sensor and the cutting blade, the at least one retainer protrusion configured to retain the sensor assembly in the opening of the ceiling,
    wherein the cutting blade includes a serrated edge.

14. The sensor assembly of claim 13, further comprising a flange disposed on the body between the sensor and the at least one retainer protrusion, the flange and the at least one retainer protrusion configured to retain the sensor assembly in the opening of the ceiling with at least a portion of the ceiling disposed between the flange and the at least one retainer protrusion.

15. The sensor assembly of claim 13, further comprising a light sensor disposed nearer the sensor end than the blade end of the body, the light sensor including a photocell disposed in a light pipe.

16. A sensor assembly to be mounted in a ceiling and electrically connected to an associated light fixture, the sensor assembly comprising:
    a body including a sensor end and a blade end opposite the sensor end;
    a sensor disposed on the body nearer the sensor end than the blade end;
    a cutting blade extending from the blade end of the body in a direction opposite the sensor end, the cutting blade configured to cut an opening in the ceiling; and
    at least one retainer protrusion disposed on the body between the sensor and the cutting blade, the at least one retainer protrusion configured to retain the sensor assembly in the opening of the ceiling,
    wherein the cutting blade includes a serrated edge.

17. The sensor assembly of claim 16, wherein the sensor includes an occupancy sensor.

18. The sensor assembly of claim 17, further comprising a light sensor disposed nearer the sensor end than the blade end of the body.

19. The sensor assembly of claim 18, wherein the light sensor includes a photocell disposed in a light pipe.

20. The sensor assembly of claim 16, further comprising a controller functionally connected to the sensor and configured to control the associated light fixture.

21. The sensor assembly of claim 16, wherein the cutting blade and the body form a single unitary part.

* * * * *